I. ALLEGRETTI.
MANNER OF PACKING AND CONVEYING ICE CREAM, WATER ICES, &c.
No. 113,239. Patented Apr. 4, 1871.
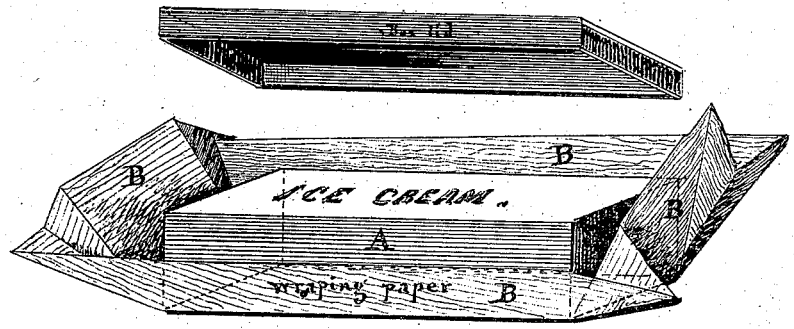
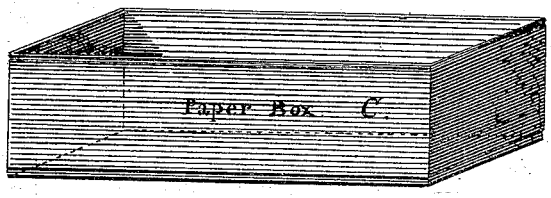
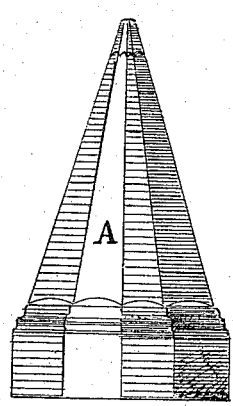
Fancy Ice Cream
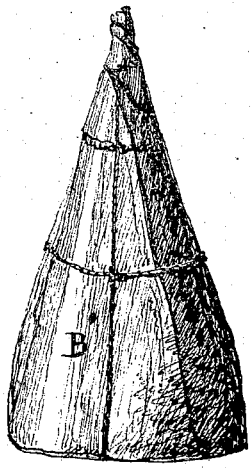
Fancy Ice Cream Packed in Paper.
Witnesses.
Inventor.
Ignazio Allegretti

United States Patent Office.

IGNAZIO ALLEGRETTI, OF PHILADELPHIA, PENNSYLVANIA.

Letters Patent No. 113,239, dated April 4, 1871; antedated March 29, 1871.

IMPROVEMENT IN THE MANNER OF PACKING AND CONVEYING ICE-CREAMS, WATER-ICES, &c.

The Schedule referred to in these Letters Patent and making part of the same.

*To all whom it may concern:*

Be it known that I, IGNAZIO ALLEGRETTI, of the city and county of Philadelphia and State of Pennsylvania, have invented certain Improvements in the Preparation of Ice-Creams or Water-Ices and in the Mode of Serving and Packing the same; and I do hereby declare that the following is a full, clear, and exact description of the same, reference being had to the accompanying drawing and to the letters of reference marked thereon.

The object of my invention is to pack and serve ice-cream or water-ices in boxes of convenient size to be carried in the hand, each box being provided with a spoon in order that the article may be eaten directly from the aforesaid boxes.

When pure water is frozen by the application thereto of either artificial or natural cold the ice produced therefrom is susceptible of absorbing a large amount of caloric before returning to the fluid state, if said ice has been submitted for a certain time to a degree of cold more intense than the point at which water does freeze, viz., 32°; and it will be found that when water is mixed or combined with vegetable or animal substances in the shape of sirups, starch, milk, gelatine, essential oils, &c., the proportion thereof may be so regulated that the mixture will acquire a certain degree of consistence when lowered in temperature; and that at a certain point the lowering of the temperature will not affect any more the consistence or solidity of the mass, although the said substance may be made to absorb a large supply of cold, which is, as it were, stored away in its mass.

To arrive at the object I have in view in this instance, my invention consists in preparing the mixtures of my ice-creams or water-ices so as to be of the proper consistence when frozen, which can only be done by repeated experiments on each different article, and in putting up my creams in the following manner:

The ice-cream or water-ice to be packed and served up by my improved method is first frozen in any ordinary known manner; it is then put up in metallic molds, preferably of parallelopipedic form; but of any form, if desired.

The metallic mold containing the ice-cream is then placed in a dry atmosphere, kept at a very low temperature, (in some cases I keep it as low as 30° below zero,) and there it is kept long enough for the whole mass to absorb and be reduced to the low temperature.

Meanwhile, I prepare boxes of non-conductor-of-heat material, such as open porous pasteboard, of the shape, but slightly larger than, the block of ice-cream, (see letter C in drawing;) and I place the boxes also in a cold dry atmosphere for a certain time.

The block of ice-cream is taken out of the mold, immediately wrapped in a piece of paper, and placed in the refrigerated pasteboard box, the laps of the paper B being folded over, and, if desired, the spoon, mentioned elsewhere, placed thereon; the lid is put on and the cream is ready to be delivered or served up; or it may be replaced in a cold dry-air refrigerator, and there kept for any length of time without losing any of its qualities.

If the proportions of foreign substance to water have been well preserved in the mixture, the consistency of the mass will be just right for being served up at any degree of cold; it may be served below 30°.

The cream or water-ice put up in this manner will remain firm and solid for a length of time lasting from one to four hours, according to the state of the weather.

In my drawing—

A represents the block of ice-cream or water-ice;

B is the wrapper or paper; and

C is the pasteboard-box.

In the case of dispensing with the box C, as indicated by the letter B', several thicknesses of refrigerated paper are used, one over the other; and if better protection is desired, batting or any porous, open, similar substance may be interposed between the papers.

The intention of putting up cream or water-ices in this manner is to sell it to parties who may desire to convey it to any desired locality where it may be eaten directly from the box without resorting to plates or saucers.

The box and spoon being made of a cheap material may be thrown away after the cream or water-ice is disposed of.

The box with the cream or water-ice to suit may be made in various forms; as, for instance, a diamond or cylindrical shape would be equally convenient for carrying in the hand.

Having thus described my invention,

What I claim, and desire to secure by Letters Patent, is—

As a new article of manufacture and commerce, ice-creams or water-ices put up in the manner herein specified, and kept for sale ready for use in rations, as it were, substantially as herein specified.

In testimony whereof I have hereunto signed my name in the presence of two subscribing witnesses.

IGNAZIO ALLEGRETTI.

Witnesses:
JAMES S. GRINNELL,
CHAS. C. WILSON.